UNITED STATES PATENT OFFICE.

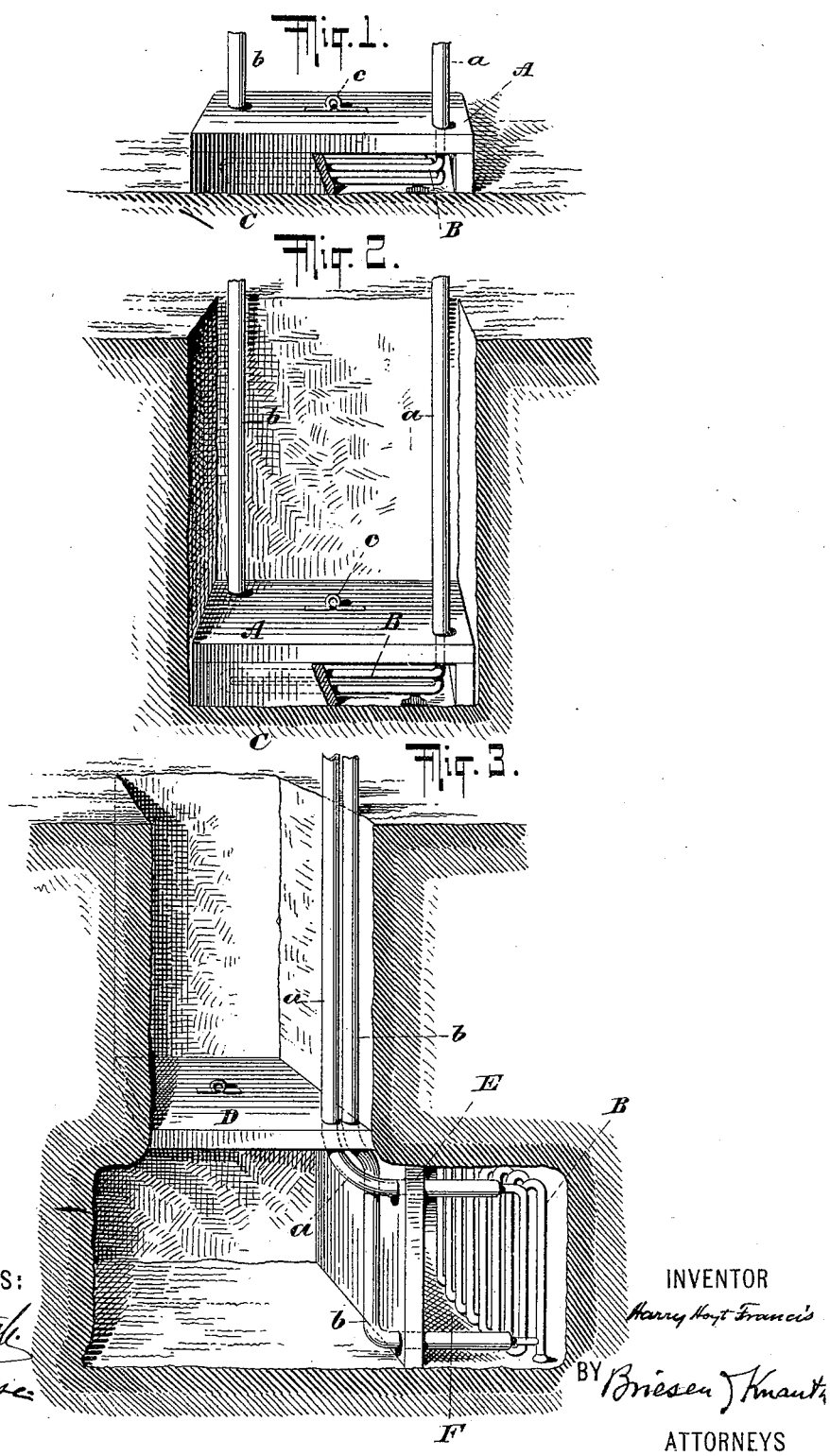

HARRY H. FRANCIS, OF MADISON, NEW JERSEY, ASSIGNOR OF ONE-HALF TO CURTIS G. CULIN, OF CRAWFORD, NEW JERSEY.

APPARATUS FOR FACILITATING EXCAVATING OR MINING.

SPECIFICATION forming part of Letters Patent No. 623,598, dated April 25, 1899.

Application filed December 2, 1897. Serial No. 660,472. (No model.)

*To all whom it may concern:*

Be it known that I, HARRY H. FRANCIS, residing at Madison, Morris county, State of New Jersey, have invented certain new and useful Improvements in Apparatus for Facilitating Excavating or Mining, of which the following is a specification.

My invention relates to an apparatus for excavating or mining, and has for its object to enable mining operations to be carried on in frozen strata.

To this end my invention consists in the apparatus hereinafter claimed.

My invention will be understood by referring to the accompanying drawings, in which—

Figure 1 is a broken-away side view of a thawing apparatus for thawing frozen ground to enable a shaft to be sunk. Fig. 2 is a sectional view of a shaft in the course of being sunk, and Fig. 3 is a sectional view of a shaft and drift being excavated by means of my improved apparatus.

According to my invention I employ a non-conducting box or cover A, preferably of asbestos, and arrange a heat-radiator B, consisting of hot-fluid-carrying pipes, within the same, $a$ and $b$ being the pipes which supply steam to and remove steam from coil B, thereby producing a circulation of steam in the system. The coil and cover are placed upon the frozen ground C, as shown, and as the steam circulates the ground under the apparatus will be rapidly thawed, the heat being well retained by the asbestos cover A and therefore localized, so that the thawing is done in an efficient manner. When the ground beneath the apparatus has been thawed sufficiently, the apparatus is removed, preferably by lifting upon the eye $c$. The layer of thawed soil is thereupon dug away until the hard frozen substrata is reached, whereupon the apparatus is lowered into the hole (see Fig. 2) and a new thawing operation takes place, the apparatus being lifted out of the said hole or shaft and the newly-thawed layer removed by digging. Thus in this manner the alternate operations of thawing and digging may be carried out, so that the shaft may be rapidly sunk.

In Fig. 3 I have shown an apparatus for drifting or tunneling. This apparatus comprises the upright or perpendicularly-presented movable coil B, which forms the extremity or connection between the descending and return pipes $a\ b$, which descending and return pipes are bent laterally in a horizontal direction. E is an upright movable shield for confining the heat to the vicinity of the coil and to protect the operatives against the heat of the said coil. D is another non-conducting diaphragm or shield for preventing the warm air in the shaft and tunnel or drift from being displaced by the external cold air. It will be understood that the coils B are brought into proximity to the side of the shaft or end of the drift or tunnel, the non-conducting covers or shields put in place, and the steam turned on as before, and after the ground has been properly thawed the cover E and coil B are moved aside and the ground dug away in the drift or tunnel. In this manner by alternately covering up the coils and thawing and removing the coils and their cover and digging the drift may be run in the same manner as the shaft was sunk.

It will be readily understood that the necessary lengthening of the pipes $a\ b$ or the employment of flexible pipes will be obvious to those skilled in the art.

What I claim, and desire to secure by Letters Patent, is—

In an apparatus for facilitating mining operations in frozen soil, the combination of the descending and return pipes $a\ b$ having horizontal lateral bends, an upright or perpendicularly-presented movable coil B forming the extremity or connection between the said pipes, the upright movable shield E for confining the heat and protecting the operatives, and the movable non-conductive diaphragm or shield D for preventing the displacement of the warm air by cold air, substantially as described.

HARRY H. FRANCIS.

Witnesses:
GEO. E. MORSE,
C. G. CULIN,
CARL P. STIRN.

Correction in Letters Patent No. 623,598.

It is hereby certified that the residence of the assignee in Letters Patent No. 623,598, granted April 25, 1899, upon the application of Henry H. Francis, of Madison, New Jersey, for an improvement in "Apparatus for Facilitating Excavating or Mining," was erroneously written and printed "Crawford, New Jersey," whereas said residence should have been written and printed *Cranford, New Jersey;* and that the said Letters Patent should be read with this correction therein that the same may conform to the record of the case in the Patent Office.

Signed, countersigned, and sealed this 2d day of May, A. D., 1899.

[SEAL.]
                  WEBSTER DAVIS,
                   *Assistant Secretary of the Interior.*

Countersigned:
 C. H. DUELL,
   *Commissioner of Patents.*